June 27, 1950
E. H. MULLINS
2,512,670
RECORDING INCLINOMETER
Filed Feb. 6, 1948
4 Sheets-Sheet 1
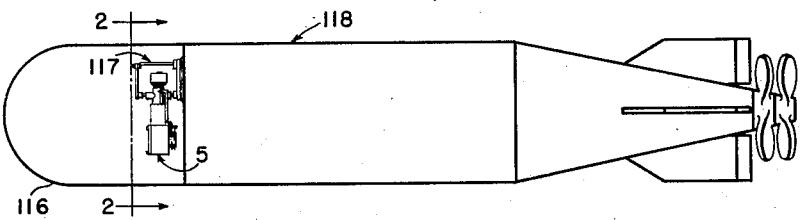
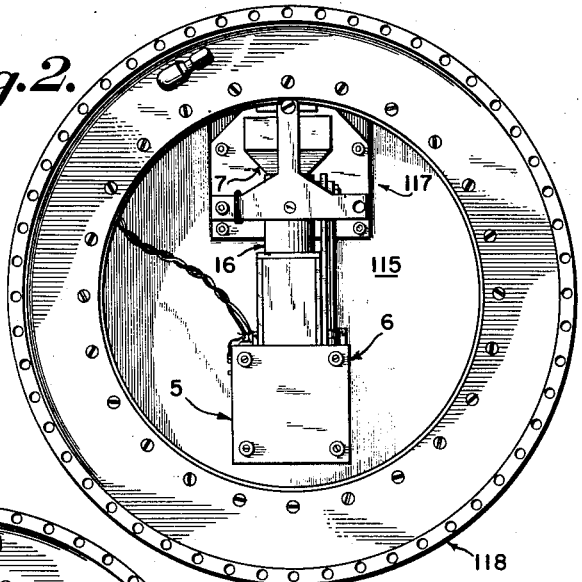
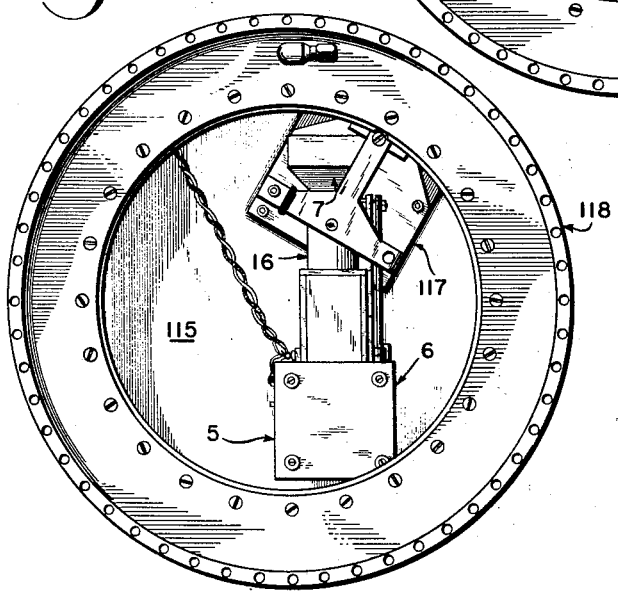
Inventor
E. H. Mullins
By M. C. Hayes
Attorney June 27, 1950  E. H. MULLINS  2,512,670
RECORDING INCLINOMETER
Filed Feb. 6, 1948  4 Sheets-Sheet 2

Inventor
E. H. Mullins

June 27, 1950 E. H. MULLINS 2,512,670
RECORDING INCLINOMETER
Filed Feb. 6, 1948 4 Sheets-Sheet 3

Inventor
E. H. Mullins
M. Hayes
By
Attorney

June 27, 1950 E. H. MULLINS 2,512,670
RECORDING INCLINOMETER
Filed Feb. 6, 1948 4 Sheets-Sheet 4

Inventor
E. H. Mullins
By
M. O. Hayes
Attorney

Patented June 27, 1950

2,512,670

UNITED STATES PATENT OFFICE 2,512,670

RECORDING INCLINOMETER

Elwood H. Mullins, Takoma Park, Md.

Application February 6, 1948, Serial No. 6,572

4 Claims. (Cl. 33—206)

(Granted under the act of March 3, 1883, as amended April 30, 1928; 370 O. G. 757)

The present invention relates generally to recording instruments and more particularly to a device of this character adapted to measure and record angular positions of a moving object such, for example, as a torpedo, relative to a vertical as established by a free falling body.

Accurate information as to the angle of attack of a torpedo, which is the angle of incline a torpedo assumes when moving through the water, has been long sought after. With such information it is possible to calculate the moments and lifts on a torpedo whereby the various controls and propelling elements thereof may be properly evaluated, such for example, as the moments and lifts versus speed, running depth and fin area, and further, to determine from a more practical basis the overall size of the torpedo relative to the other components thereof. Since this angle is often less than one degree considerable difficulty has been encountered in measuring this angle to the accuracy required to put the theory of torpedo motion and its control on a precise and practical basis.

Most of the instruments heretofore developed to measure torpedo angles have depended for their means of orientation upon either pivotally supported pendulums or gyroscopes. It has been found, however, that both such methods of control, when applied to this particular problem, were inadequate to obtain a high degree of precision of measurement required of a device of this character.

With instruments of the pendulum controlled type, serious error was often introduced into the record by oscillatory motion of the pendulum in response to acceleration forces being applied to the pendulum at its point of pivot. With such devices the record was always questionable, for at no time could it definitely be known whether the instant position of the pendulum was a true indication of gravity or the result of oscillatory motion.

With gyrostabilized devices there was the difficulty of determining the initial direction of the gyro and furthermore, the friction within the gimbals mounting therefor often caused the gyro to drift or progress from its initial position of release. There was also the possibility of error as caused by malfunction of any one or several of the numerous mechanical and electrical components required to signal, amplify and record the position of the gyro relative to that of the torpedo.

For the reason that falling bodies are primarily affected only by gravity and will maintain substantially the horizontal velocity imparted thereto at the time of release, this principle has been employed in the present device which provides that a target assembly be rigidly attached to the point of release of a free falling body, whereby, as the entire assembly is tilted, the distance from the point of impact of the falling body with the assembly tilted to the point of impact with the assembly vertical will be proportional to the angle of tilt of the device and will permit accurate computation of the degree of incline of the instrument to as low as .002 of a degree.

By the same token, if a plurality of bodies, uniform in character, are dropped singularly at predetermined intervals on a target and the point of impact of each with the target is recorded relative to the reference vertical of the instrument, the recording may be subsequently used to determine the position of the instrument at any instant during the operation thereof.

In a somewhat broader sense, each falling body or ball as used in the present instrument, might be regarded as an individual pendulum, that after having been released, is substantially free of all influences except that of gravity, and therefore incapable of oscillation or acceleration. Such error as might be introduced into the record, as by gradual changes in velocity of the body carrying the device, may be computed by the formula:

$$\phi = \arctan \frac{A}{G} \text{ in which}$$

A = horizontal acceleration,

G = acceleration of gravity and $\phi$ = angular error

If, however, the accelerations are vibratory and the angle being measured holds constant over an appreciable length of time, an average of the angles indicated by a number of drops will cancel out the acceleration errors and will yield a measurement of the desired angle within the basic accuracy of the instrument.

It is an object of the present invention to provide a new and improved recording inclinometer adapted to measure and record angular positions thereof with respect to a reference axis.

Another object is to provide a torpedo recording inclinometer adapted to measure and record the angular position of a torpedo as it moves through the water.

Another object is to provide a tilt recording instrument wherein the respective travels of a plurality of falling bodies released in successive order are recorded selectively according to the inclination of the instrument whereby the deviation of the instrument at any instant over the time interval during which the bodies were released may be calculated with respect to a reference axis.

Another object is to provide a tilt recorder wherein a recording tape is driven synchronously with a ball releasing mechanism, the tape being so arranged with respect thereto as to be struck by the falling balls whereby, the impression made by the balls on the tape may be subsequently used as a graph for determining the angle of tilt of the recorder during a predetermined interval of operation of the device.

Still another object is to provide a recording inclinometer having means for dropping a plurality of balls singly in succession at predetermined intervals upon a moving recording tape whereby the tilt of the inclinometer may be determined from the relative positions of the ball impressions upon the tape.

A further object is to provide a tilt recording instrument wherein a reference line is inscribed on a moving recording tape and a plurality of balls are dropped singly in succession on the tape adjacent to the reference line and selectively with respect thereto, in accordance with the direction and degree of tilt of the device from a predetermined initial position of the instrument.

A still further object is to provide a tilt recording instrument wherein a plurality of balls are dropped singly in succession at predetermined intervals of time upon a constant speed waxed tape having thereon a zero reference line whereby the angle of inclination of the instrument may be determined by comparing the point of impact of the balls on the tape with the zero reference line.

Additional objects, features, and advantages of the present invention are those residing in and relating to the novel construction and arrangement of the elements thereof, as will more clearly appear from the following description, reference being made to the accompanying drawings, of which:

Fig. 1 is a diagrammatic view of a torpedo in a vertical position and having the inclinometer of the present invention arranged therein;

Fig. 2 is an enlarged view of the instrument and mounting therefor taken along the line 2—2 of Fig. 1;

Fig. 3 is a view similar to that of Fig. 2 and showing the torpedo in roll position 30 degrees from the vertical;

Figures 4, 5:
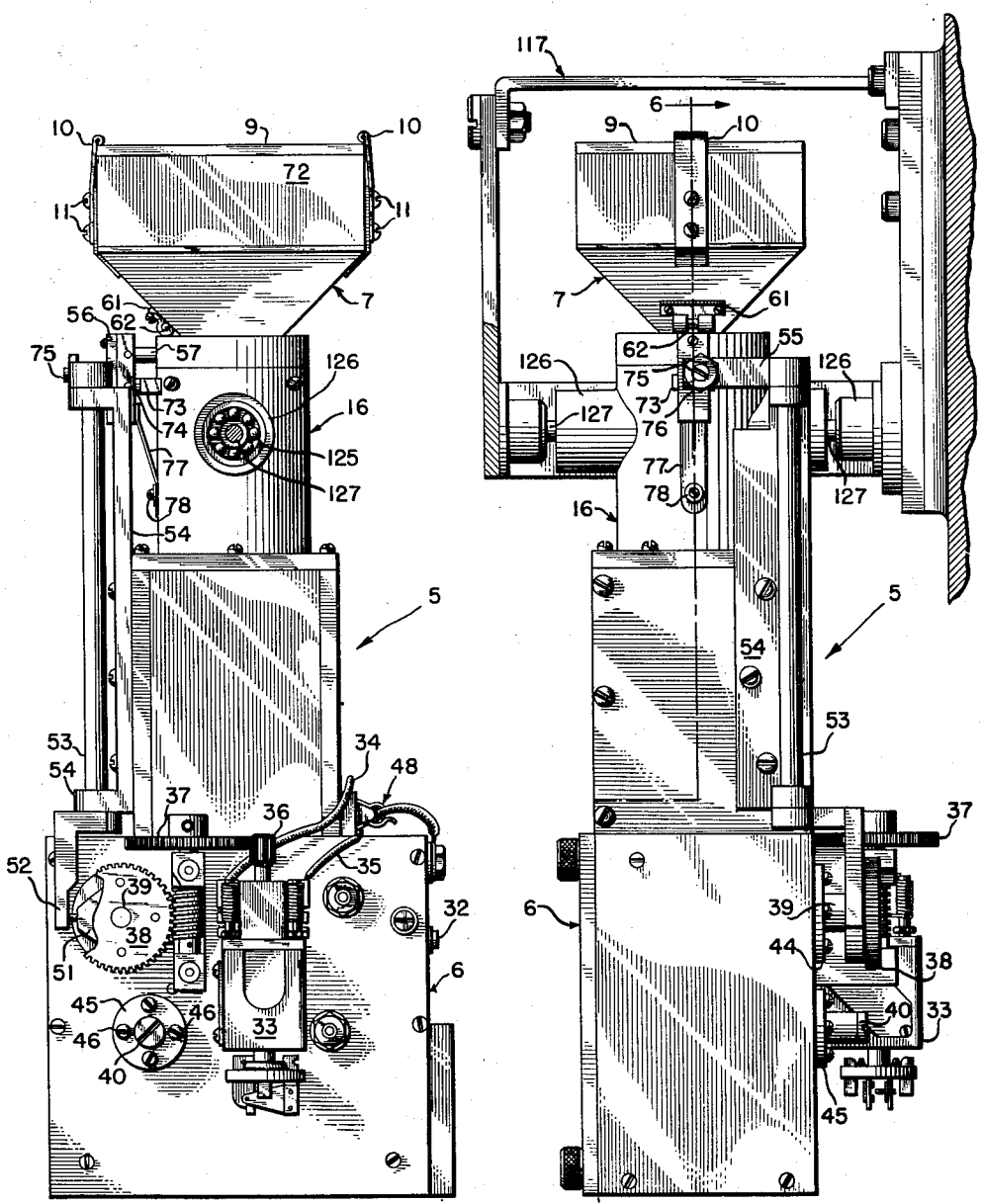
Fig. 4 is an end view of the inclinometer.
Fig. 5 is a side view of the instrument of Fig. 4 pivotally suspended vertically within the torpedo.
Figure 6:
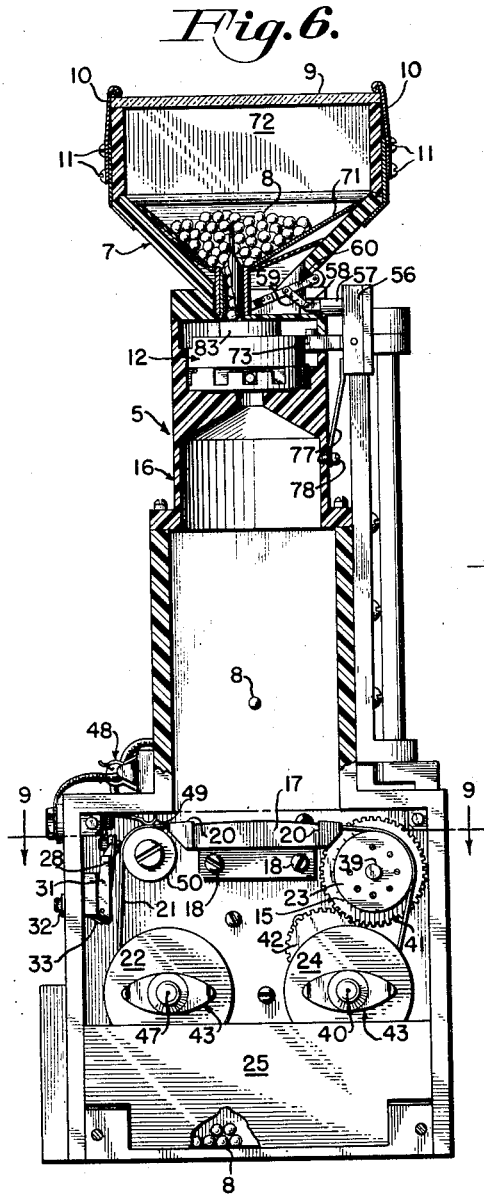
Fig. 6 is a view taken substantially along the line 6—6 of Fig. 5.

Referring now to the drawings and more particularly to Figs. 4 to 6 thereof, the angle recorder generally designated 5 includes the housing 6 having arranged thereon a hopper assembly 7 adapted to hold a quantity of highly uniform balls 8 formed preferably of steel and supplied thereto through the opening now shown closed by the preferably transparent cover plate 9. This plate is adapted to be retained in position on the hopper as by a pair of spring latch members 10 secured to the wall of the hopper as by screws 11.

Interposed between the hopper and housing is a ball releasing assembly generally designated 12 including a reciprocating slide member 13, adapted, as will hereafter be more fully described, to release at predetermined intervals a ball from the hopper to allow the ball to fall through the housing to strike an anvil member 17 arranged therebeneath.

Guided over the anvil by lugs 20, in a manner to be struck by the falling ball 8, is a strip of tape 21 supplied thereto from spool 22. The tape is drawn across the anvil by a constant speed drum member 23 having thereon outwardly projecting pointed sprocket members 15 suitable for penetrating the surface of the tape whereby the tape is prevented from slipping as it is drawn over the drum to be wound on the takeup spool 24. The surface of this tape is preferably waxed or otherwise suitably treated for recording impressions made thereon by the balls as they strike against the surface thereof.

The face of anvil 17 is slightly oval in character to thereby facilitate the discharging of the balls from the surface thereof after striking the tape, the balls to roll from the anvil into the removable receptacle 25 arranged therebeneath as better illustrated in Fig. 6.

A pointed stylus 28 is secured to the side wall of the housing by a hinged bracket member 31 and adapted to be urged in the direction of the tape by spring member 33. The pointed end of the stylus serving to inscribe in the waxed surface of the tape a line 30, as the tape moves therebeneath thereby indicating the reference vertical through the device. The orienting of the stylus 28 with respect to the instrument vertical is done by releasing a ball from the hopper while the instrument is at rest in a true vertical position whereupon the stylus is then set to the point of impact of the ball by shifting the bracket 31 on the housing by the loosening of screws 32. A subsequent tilting of the instrument in a plane transverse to the direction of the movement of the tape will cause the ball to fall to the right or left of the reference line, as the case may be, a distance proportional to the degree of incline of the device. With the use of a toolmaker's microscope the deviation of the impact point of each ball from the scribed reference line or vertical, may be read thereon to the nearest .0001 of an inch.

Fastened preferably to the outer surface of the housing, is a contstant speed electrically driven motor 33, Figs. 4 and 5, operative, by current supplied thereto through leads 34 and 35, to rotate drum 23 by way of gear train 36, 37, and 38. Motion is communicated from the drum shaft 39 to the spool shaft 40 through spur gears 41 and 42. A friction clutch assembly generally designated 43 permits the takeup spool 24 to rotate at a speed different from that of the shaft 40 or as the tape is supplied thereto after passing over drum 23. Shafts 39 and 40 are supported for free movement within the wall of the housing by bearing members 44 and 45 respectively which are secured to the housing as by screws 46. The tape supply spool 22 is freely rotatable on a fixed shaft 47, subject, however, to the drag of the spring friction clutch assembly generally designated 43 the like of which is well known in the art.

Figure 7:
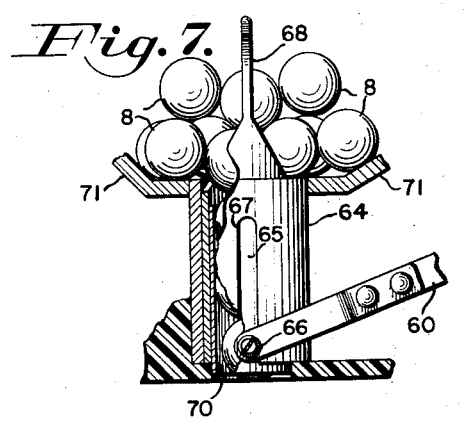
Fig. 7 is an enlarged elevational view partly cut-away of the ball scoop assembly.
Figure 8:
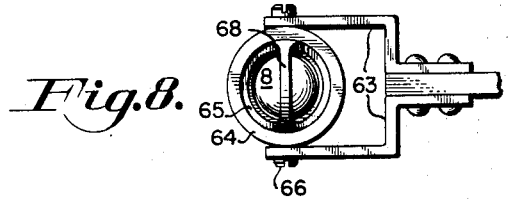
Fig. 8 is a plan view of the scoop assembly of Fig. 7.
Figure 9:
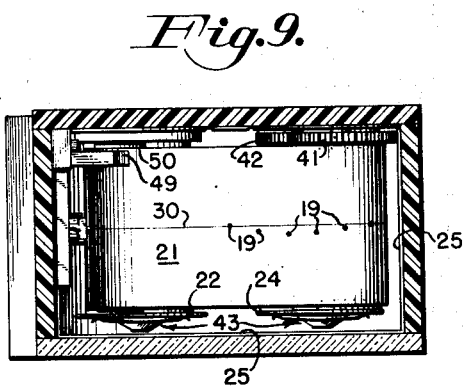
Fig. 9 is a view taken along 9—9 of Fig. 6 and showing the ball imprints and reference line on the recording tape.
Figure 10:
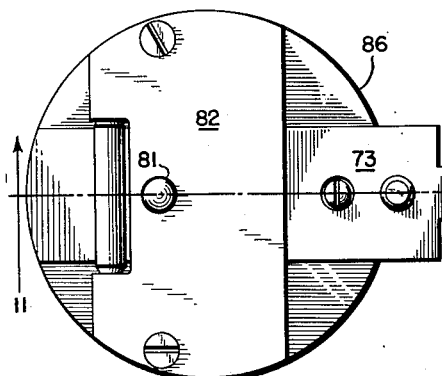
Fig. 10 is a plan view of the ball releasing assembly.
Figure 11:
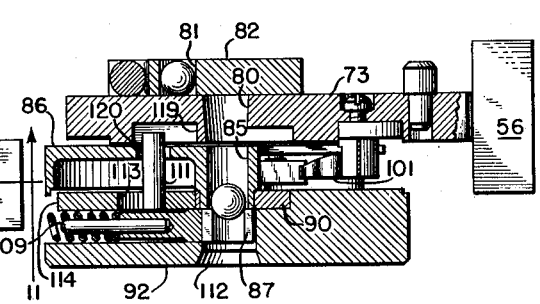
Fig. 11 is a view of the releasing assembly taken along line 11—11 of Fig. 10.

Provided on the inner surface of gear 38 is a cam member 51, Fig. 4, adapted, upon rotation of the gear to cam outwardly a rocker arm 52 pivotally connected to the housing as by shaft and bracket 53 and 54 respectively. The movement of the arm is communicated through the shaft 53 to a second arm 55 that is adapted when oscillated, to intermittently press inward in the direction of the housing a linking or block member 56 to which is fastened a plunger 57. Suitably connected to the plunger as by pin 58 is a link 59, adapted, as the plunger is forced inwardly, to press upwardly an arm 60 hinged at one end to the wall of the hopper as by pin and bracket 61 and 62 respectively. The free end of arm 60 is provided with a bifurcated portion 63 adapted to extend around the guide sleeve 64 for connecting with a scoop member 65 by screws 66 that extend through elongated openings 67 provided therefor in opposite sides of the guide as illustrated to advantage in Fig. 7. As arm 60 is lifted by the inward movement of plunger 57, the extending ring loop portion 68 of the scoop, is forced upward through the balls 8 to thereby agitate the balls in such a manner as to cause one or more of the balls to fall into the opening 70 of the scoop Fig. 7, to be fed in this manner to the ball releasing mechanism 12 arranged therebeneath.

A partition 71, secured to the inner surface of the hopper and guide, directs the balls into the scoop as well as provides a closure for the bottom of the ball retaining portion of the hopper 72.

The slide 73 of the ball releasing mechanism is secured to the block 56 as by pin 74 whereby the slide is oscillated as the block is shifted by the motion of arm 55 responsive to the movement of cam 51. A set screw 75 threadedly arranged through arm 55 and locked therewith by nut 76 permits adjustment of the arm with respect to the face of the block and thereby controls the movement of the slide. A spring 77 secured to the housing beneath the slide by screws 78 is operative to yieldably bear against the inner surface of the block and operative to return the slide to its extended position after having been forced inwardly by the motion of rocker arm 55.

Arranged through the slide 73 is a perpendicular bore 80 adapted to align with opening 81 within the slide retaining plate 82 and the vertical ball column within guide 70 as the slide is forced inwardly by rocker 55. The aligning of the hole 80 with the ball column permits a ball to drop from the column into the bore to thereby be carried by the slide inwardly to align with the central opening 85 provided beneath the slide in the body member 86 through which the balls drop to the surface of jaws 87 and 88. By this reciprocating motion of slide 73, balls are supplied singularly to the dropping jaws of the device where they are released at intervals corresponding to the oscillating motion of arm 55 as will become more apparent as the description proceeds.

Figure 12:
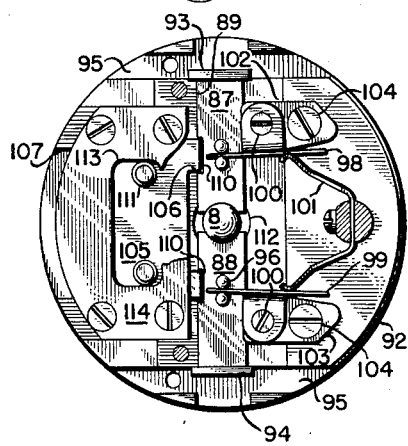
Fig. 12 is a view of the jaw assembly of the ball releasing mechanism with the cover plate, slide and retaining plates for the jaws removed and showing the jaws in their ball retaining position
Figure 13:
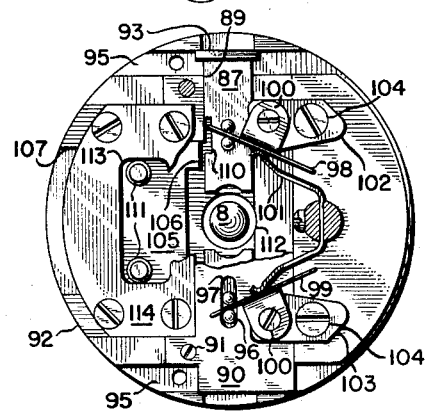
Fig. 13 is a view similar to Fig. 12 with the jaws shown in ball releasing position and the jaw retaining plate in position and partly cutaway.

The jaws 87 and 88 are freely movable within a keyway 89 and retained therein by cover plate 90, Fig. 13, secured as by screws 91 to the lower plate 92. Stop surfaces 93 and 94 provided on the ends of each jaw serves to limit the travel of the jaws by engaging the side walls of slot-ways 95 as the jaws move to their extreme positions. A pair of closely positioned pins 96 extending upwardly from the surface of each jaw through elongated openings 97, Fig. 13, provided therefor in plate 90, to connect with a pair of pivotally mounted arms 98, 99, Figs. 12 and 13, whereby the jaws are shifted either together or apart, as the case may be, by swinging movement of the arms about their pivoted connection 100 as caused by pressure thereagainst of bow spring 101 as the spring force is shifted back and forth across the point of pivot by the oscillatory motion of slide 73. Supporting the arms in proper operative relation to the jaws are bracket members 102 and 103 respectively that are secured to the lower plate 92 as by screws 104.

To insure a positive opening of jaws 87 and 88 and thereby provide for accurate releasing of the balls 8, a locking member 105 having lug portions 106 thereon, is slideably arranged within guide way 107, Figs. 12 and 13, and adapted to be urged by spring 109 into locking engagement with grooves 110 in the jaws respectively, until such time as the bow spring 101, carried by slide 73, has moved substantially inward on arms 98 and 99. This inward movement of the spring on the pivotal arms applies a biasing pressure thereon in the direction of their jaw opening position whereby, as the lugs 106 are disengaged from the jaws by the engagement of shoulder 119 of slide 73 with studs 111 of the lock, as slide 73 moves to its ball receiving position, the jaws are caused to suddenly snap outwardly to allow the ball 8, that has been left resting thereon by the slide, to drop through opening 112 in lower plate 92 and through the housing to the surface of the recording tape 21.

Studs 111 are rigidly connected with the locking member 105 in any suitable manner as by press fitting into complementary aperture provided therefor in the member, the studs being of sufficient height to extend upwardly through openings 113 and 120 in the retaining plate 114 and plate 86 respectively, in a manner to be engaged by shoulder 119 on slide 73 as the slide moves inward to its ball receiving position.

The concave ball engaging surface of jaws 87 and 88 respectively, operate to center the ball as it rests thereon prior to its release. The jaws are so spaced as to engage the ball as near the center thereof as possible; in this way the reaction of the jaws on the ball is kept at a minimum, as the jaws are disengaged therefrom.

The operation of the instrument is entirely automatic other than the initial loading of the tape and balls in the device. The instrument 5 is housed in a watertight compartment 115 in the torpedo exercise head 116 and mounted upon a pivot system generally designated 117 whose axis is parallel to the longitudinal axis of the torpedo 118, thus allowing for roll of the torpedo while maintaining the target area essentially normal to gravity. The ball bearing inserts 125 recessed within the trunnions 126 of the instrument are adapted to receive the adjustable shafts 127 of the mount whereby the friction at the connections is reduced to the minimum.

Prior to a test run, the base line on the tape 30 is adjusted to coincide with the ball imprints 19 when the torpedo is at rest in a true horizontal position. The mechanism is to be started in any suitable manner as by water pressure upon a hydrostatic switch mechanism after the torpedo has been launched.

The constant speed motor 33 draws the tape 21 across the anvil at approximately one inch per second in a perpendicular transverse direction to the vertical line thereon, as determined by normal ball flight. The ball feeding and releasing mechanisms are operated simultaneously at approximately one cycle per second. When the tape supply is exhausted the contact 49, normally held in open engagement with the roller 50 by the tape therebetween, moves into contact with the roller to close a shorting circuit through a fuze assembly 48 connected in series with motor 33, this operation ruptures the fuze to stop the device thereby preventing possible damage to the anvil by a continuation of the balls dropping against the unprotected surface thereof.

After the run, the tape 21 is removed from the instrument and placed upon the stage of a toolmaker's microscope or the like, which is adapted to read to the nearest 0.0001 inch the deviation of the impact point of each ball from the scribed reference line 30, from which the corresponding angle of inclination of the torpedo at any given time during the operation of the device may be computed.

It is understood that the utilization of the instrument for recording torpedo motion is only one of many obvious uses of the device. It is anticipated that it may be of use in determining the tilt of an oil well shaft at a point several hundred feet below the earth's surface or the angle of a submarine periscope sighting head or the angle of inclination of a test model plane or rocket or the like.

While the invention has been described with reference to but one example thereof which gives satisfactory results, it is to be understood by those skilled in the art to which the invention pertains, after understanding the invention, that various changes and modifiations may be made therein without departing from the spirit and scope of the invention, and it is intended therefore, in the appending claims to cover all such changes and modifications.

The invention herein described and claimed may be manufactured and used by and for the Government of the United States of America for governmental purposes without the payment of any royalties thereon or therefor.

What is claimed as new and desired to be secured by Letters Patent of the United States is:

1. A device of the character disclosed for recording in time spaced relation tape indications representing the deviations of the longitudinal axis of a running torpedo from a horizontal plane comprising, in combination, a reservoir having a copious supply of uniform balls therein, a housing for said reservoir, means for pivotally supporting said housing within the torpedo for pendulous movement about an axis arranged parallel to said longitudinal axis, means for releasing said balls singly in succession from said reservoir at uniform time intervals during the run of the torpedo, means carried by said housing and including a length of tape arranged beneath said ball dropping means for recording on the tape the points of impingement of the released balls thereon, means for moving the tape at a uniform rate normally parallel to said horizontal plane and perpendicular to said longitudinal axis whereby the ball points recorded on the tape provide a time measure of the torpedo run in a series of uniform intervals of time, and means for inscribing a continuous reference line on the tape coincidental with the ball recordings recorded thereon when said longitudinal axis is parallel to said horizontal plane whereby deviations of the ball recordings to either side of the reference line indicate the direction and the amount of the deviations of the longitudinal axis of the torpedo from said horizontal plane.

2. An instrument of the character disclosed for recording in time spaced relation tape indications representing the deviations of a running torpedo from a horizontal plane comprising, in combination, a housing arranged in said torpedo, a reservoir arranged on said housing and having a copious supply of uniform balls therein, a release mechanism operatively connected to said reservoir and adapted to release said balls therefrom individually at predetermined time intervals, means for pivotally supporting said housing within the torpedo and arranged to cause said balls to fall within a vertical plane parallel to the longitudinal axis of the torpedo, a platen carried by said housing and disposed beneath said release mechanism in the path of the released balls, a length of recording tape movable over said platen in a direction normal to the longitudinal axis of the torpedo and arranged to be struck by the released balls whereby ball impressions are made on the tape at the time of the ball impingement therewith, means including a constant speed motor for driving said tape across said platen at a uniform rate whereby the ball impressions upon the tape are indicative of the torpedo run in uniform intervals of time, and means for inscribing on the tape a longitudinal reference line coincidental with ball impressions recorded on the tape when the torpedo axis is parallel to said horizontal plane whereby the deviation of said ball impressions from the reference line are indicative of the degree of inclination of the torpedo axis from the horizontal plane.

3. An instrument of the character disclosed for measuring and recording the deviations of a running torpedo from a horizontal plane including a housing, trunnion means for pendulously supporting said housing within the torpedo, means for securing said trunnion means to the torpedo with the pivotal axis thereof arranged parallel to the longitudinal axis of the torpedo whereby the housing is tilted only by a deviation of the axis of the running torpedo from said horizontal plane, a hopper arranged on said housing, a copious quantity of uniform balls disposed within said hopper, a constant speed motor, a ball release mechanism arranged beneath said hopper and connected to said motor and operated cyclically whereby to release the balls singularly at predetermined intervals during successive cycles of operation, a platen arranged in said housing beneath said release mechanism, and a length of recording tape movable by said motor horizontally at a uniform rate over said platen in a direction normal to the direction of movement of said torpedo through the water and within the path of the falling balls whereby during the run of the torpedo ball impressions are recorded on the tape in uniform time spaced relation along the length thereof and in variable spaced relation transversely thereof in accordance with the degree of inclination of the torpedo from said horizontal plane.

4. An instrument of the character disclosed for measuring and recording the deviations of a running torpedo from a horizontal plane including a housing, trunnion means for pendulously supporting said housing within the torpedo, means for securing said trunnion means to the torpedo with the pivotal axis thereof arranged parallel to the longitudinal axis of the torpedo whereby the housing is tilted only by a deviation of the axis of the running torpedo from said horizontal plane, a hopper arranged on said housing, a copious quantity of uniform balls disposed within said hopper, a constant speed motor, a ball release mechanism arranged beneath said hopper and connected to said motor and operated cyclically thereby to release the balls singularly at predetermined intervals during successive cycles of operation, a platen arranged in said housing beneath said release mechanism, a length of recording tape movable by said motor horizontally at a uniform rate over said platen in a direction normal to the direction of movement of said torpedo through the water and within the path of the falling balls whereby ball impressions are recorded thereon in uniform time spaced relation during the run of the torpedo, and a stylus for inscribing on the moving tape a reference line coincident with the ball recordations when the instrument is in a vertical position whereby deviations of the ball recordations from said line as the torpedo tilts from a horizontal plane indicate the degree and direction of tilt of the axis of the torpedo from the horizontal and the time and duration of said tilt.

ELWOOD H. MULLINS.

REFERENCES CITED

The following references are of record in the file of this patent:

UNITED STATES PATENTS

| Number | Name | Date |
| --- | --- | --- |
| 1,908,347 | Harley | May 9, 1933 |
| 1,916,301 | Cole | July 4, 1933 |
| 1,959,141 | Sperry, Jr. | May 15, 1934 |
| 2,316,906 | Wait | Apr. 30, 1943 |
| 2,399,199 | Brandon | Apr. 30, 1946 |
| 2,401,609 | Burgess | June 4, 1946 |
| 2,402,395 | Hagner | June 18, 1946 |
| 2,411,425 | Hagner | Nov. 19, 1946 |

FOREIGN PATENTS

| Number | Country | Date |
| --- | --- | --- |
| 259,890 | Germany | 1913 |